April 22, 1969

R. E. SCHOTT
3,439,708
HYDRAULIC CONTROL VALVE

Filed April 3, 1967

Inventor
Robert E. Schott
By
Attorney

United States Patent Office 3,439,708
Patented Apr. 22, 1969

3,439,708
HYDRAULIC CONTROL VALVE
Robert E. Schott, New Berlin, Wis., assignor to Allis-Chalmers Manufacturing Company, Milwaukee, Wis.
Filed Apr. 3, 1967, Ser. No. 627,999
Int. Cl. F04b 49/08
U.S. Cl. 137—596.13      7 Claims

ABSTRACT OF THE DISCLOSURE

A hydraulic control for use in a hydraulic system to control hydraulic pump loading and position of an actuating cylinder. The control includes a directional valve for operating a hydraulic actuator, a by-pass valve for returning excess flow to the reservoir and a switch valve controlling actuation of the by-pass valve.

---

This invention relates to a control valve and more particularly to a pump loading and flow control valve for operating a fluid actuator.

Various hydraulic fluid systems are used as actuators on motor vehicles. The actuators are used to operate such devices as power steering, braking, clutch actuating or implement control of one kind or another. One particular type of implement control used extensively today is a draft control device wherein distribution of the implement and tractor weight is controlled to provide the adequate traction in accordance with the draft load. A further requirement of a draft control valve is to position the implement in a travel position wherein the implement is carried in a raised position to permit rapid traveling of the tractor.

The hydraulic systems used with these types of actuators are preferably a system which minimizes the loss in throttling and the power loss due to a hydraulic pump operating against an excessive load when the pressure in the system is not required to do useable work. Another loss present in conventional system is in metering or throttling during the application or removal of the load on the hydraulic activator.

A hydraulic system may use a variable displacement pump which is pressure sensitive or a constant volume pump which has a constant displacement but has provisions for bypassing the hydraulic fluid when the fluid is not required by the hydraulic actuator. It is desirable to provide a system wherein the throttling is kept to a minimum and the pump is unloaded when the power requirements are not demanded in the hydraulic system. The subject invention provides these advantages through the use of a switch valve, a directional valve, and a pressure control valve which reduces the operating pressure of the pump to a minimum when the load requirements are not demanded of the system. A particularly good example of the use of this type of a system is in a draft control device which senses the draft load of the tractor and automatically distributes the weight to provide adequate traction of the rear wheels of the tractor to pull the load. The valve will cause the system to lift the implement to a raised travelling position when it is desired by the operator of the tractor.

It is an object of this invention to provide a valve having flow control characteristics and pump unloading means to provide minimum heat loss in the hydraulic system.

It is another object of this invention to provide a flow control valve having minimum throttling and minimum pumping pressure for the hydraulic pump when load requirements are not required by the system.

It is a further object of this invention to provide a flow control valve effectively by a flow divider means and a switch valve which will divert a portion of the pressurized fluid back to the reservoir while using only a portion necessary for load requirements.

It is a further object of this invention to provide a flow control valve having a switch valve to regulate flow return to the reservoir and control the flow to the fluid actuator.

It is a further object of this invention to reduce throttling in a hydraulic system, provide unloading of a hydraulic pump when in the no-load condition and automatically provide the pressure and rate of flow to the fluid actuator.

The objects of this invention are accomplished by providing an inlet and a flow return outlet passage in communication through a pressure regulator valve. An actuator outlet is also formed in the valve. A flow divider valve is in communication between the inlet passage and the outlet passages to divide the flow of pressurized fluid to the return line and to the fluid actuator line to provide the proper actuating characteristics. A switch valve is also incorporated in the flow control valve whereby the fluid pressure actuates the switch valve causing pressurized fluid to flow to the actuator instead of the return passage for actuation of the actuator at whatever load requirements are necessary. The preferred embodiment of this invention will be described in the following paragraphs and are illustrated in the attached drawings:

Figure 1:
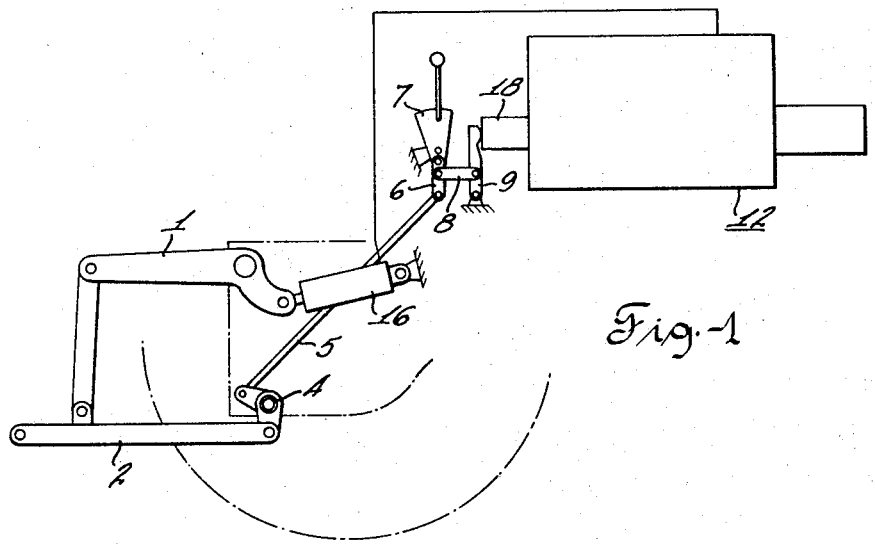
FIG. 1 is a schematic illustration of a use of the hydraulic valve on a tractor as a draft control valve.

Referring to the drawings, the valve as illustrated is used in a constant volume pump hydraulic system. It is understood that this valve might also be used in a variable displacement pump hydraulic system. Its use has special advantages in a constant volume system where throttling becomes a very distinct problem.

Figure 2:
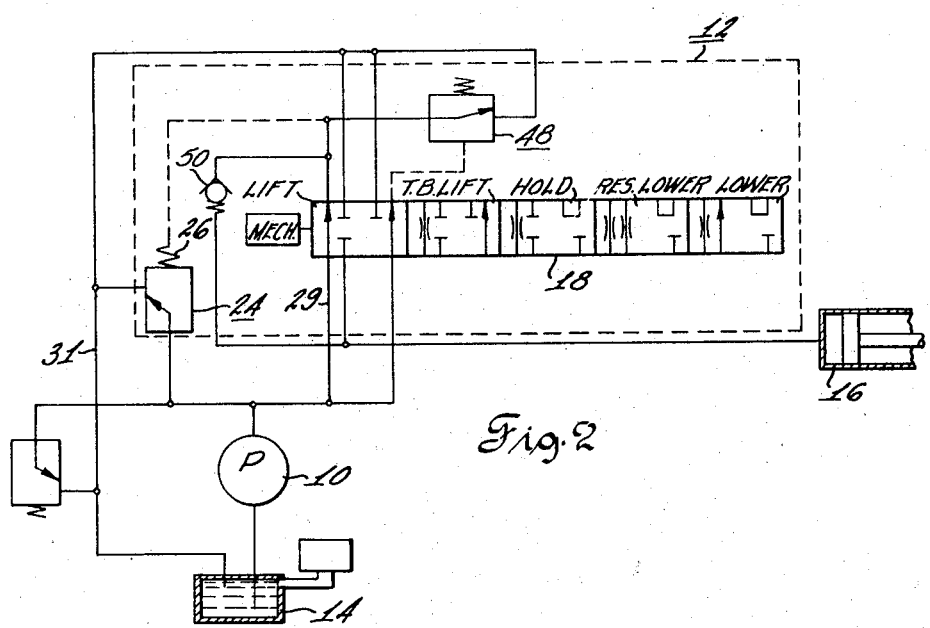
FIG. 2 is a schematic drawing of the flow control valve and hydraulic system.

Referring to the drawings, FIG. 2 illustrates the schematic drawing of the hydraulic system including the control valve. The hydraulic system as shown in the diagram includes a fixed displacement pump 10, a hydraulic control valve 12, the reservoir 14, and a reciprocal fluid actuator 16 which actuates the rear lift arms 1 of the tractor. The control valve spool 18 is shown in its hold position in FIG. 4. Pressurized fluid from the pump 10 enters the valve 12 at chamber 20 and through restrictive grooves 22, passage 30, and valve slot 60 to the reservoir, and also through valve 24 to the reservoir 14. Valve 24 which under these conditions functions as a bypass valve and is urged towards its illustrated closed position by the spring 26 and towards its open position by the force of the pressure differential between the annular chambers 34, and 62 being in communication with chamber 30, which acts on the valve element 49. The rate of the spring 26 is made relatively low so that the displacement of the valve 24 from its closed position to its open position will only involve a small increase in the pressure of the spring 26, as a result most of the pressurized fluid in chamber 20 will pass through valve 24 and opening 36 to the reservoir 14. The pressure drop from chamber 28 to 30 is substantially equal to the loading of spring 26.

More specifically the pressurized fluid enters valve 24 at chamber 34 passes through the orifice 38 in the spool land 40 so that the fluid pressure engages the valve face 42 thereby moving the valve element 49 to the right against the spring 26 rated at approximately 40 pounds per square inch to open the chamber 34 to the reservoir outlet passage 36. Pressurized fluid also enters the annular chamber 28 around the spool 18 in bore 32, through restricting grooves 22 formed in the spool valve land 44 and through passage 30 and 46 to the reservoir opening 36.

The valve 24 operates primarily as a bypass valve and in the neutral or hold position, as a pressure regulator valve when a load is placed on the pump.

When the draft sensing device as illustrated in FIG. 1 senses an increase in the draft load, the draft sensing mechanism operates the control spool 18. The draft members 2 are connected to an arm on the draft sensing device 4. A second arm is connected to the rod 5 which is pivotally connected to the lever 6. The lever 6 is pivoted on the lower end of the hand lever 7 which is hinged on the vehicle. A link 8 is pivotally connected to the mid-section of lever 6 and lever 9 which is also pivotally connected to the tractor and the opposite end of the lever 9 engages the end of spool 18. The draft sensing mechanism actuates the control valve spool 18 allowing pressurized fluid to enter chamber 41 of the switch valve 48 to thereby close the valve and to block the path to the reservoir. The pressure actuating against the switch valve element 91 increases sufficiently to overcome the biasing force of the spring 58 and causes the valve element 48 to move to the right. More specifically the land 52 opens the chamber 54 to the pump pressure and with the chamber in communication with the chamber 41 by means of passage 56, the fluid pressure moves the switch valve to the right against the biasing force of the spring 58. Fluid in spring chamber 95 is permitted to pass around the periphery of the loosely fitted land 96 to chamber 41. The opposite end of the valve element 91 has a slotted opening 60 which provides the path from chamber 30 to reservoir passage 46. As the opening 60 gets progressively smaller and closes due to the switch valve moving to the right, the pressure builds up in the passage 30 and chamber 62 causing the unseating of the ball-check 50 and the directing of pressurized fluid to the hydraulic actuator 16. The pressure in chamber 62 also moves the valve element 49 to the left which under these conditions functions as a flow control valve by restricting the flow of fluid to the reservoir and increasing the flow of fluid to the actuator 16. It should be noted that a controlled rate of flow is established to the actuator 16 as the pressure differential between the chambers 34 and 62 is always the value of the spring 26 which is approximately 40 pounds per square inch. In this condition flow to the actuator 16 is a function of the orifice size which is variable with the position of the spool 18.

When the spool 18 has moved to its full movement to the right the hydraulic motor is in its full lift position and the land 44 is opened to pump pressure and valve 24 is closed to divert all the fluid flow to the actuator 16.

When the spool 118 is moved in the left-hand direction the control valve is in the restricted lower or lower position. The actuator outlet passage 15 is in communication with the hydraulic actuator and receives fluid from the hydraulic actuator. In the restricted lower position of the spool 18 the implement is being lowered at a controlled rate due to the restriction of the orifice of the return passage, in the lower position the return is unrestricted and the implement is lowered at a faster rate. The return chamber 17 is in communication with the motor outlet passage 15. When the poppet valve element 19 is lifted from its seat the return flow of pressurized fluid from the actuator passes around the periphery of the valve seat 19 through the chamber 21 around the land 23 and through the passage chamber 37 and to the passage 25 to return to the reservoir.

The operation of the valve will be described in the following paragraphs.

As illustrated the control valve may be operated manually by lever 7 to provide a lift of the implement whenever desired. The control valve may be operated automatically by the draft sensing mechanism as illustrated in FIG. 1. Referring to the schematic diagram the valve is shown schematically having five positions. These five positions are indicated on the drawing. Beginning from the left-hand side the five positions including lift, traction boost lift, hold, restrictive lower, and lower. Initially consider the control valve in the neutral or hold position. The hold position is the intermediate portion of the spool 18 illusrated in the schematic diagram of FIG. 2.

Figure 4:
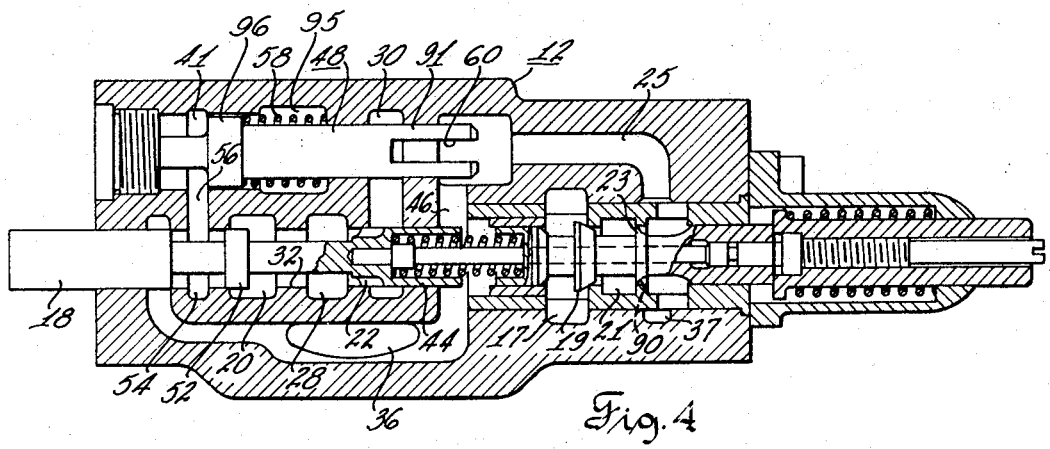
FIG. 4 is a cross section view taken on line IV—IV of FIG. 3.
Figure 5:
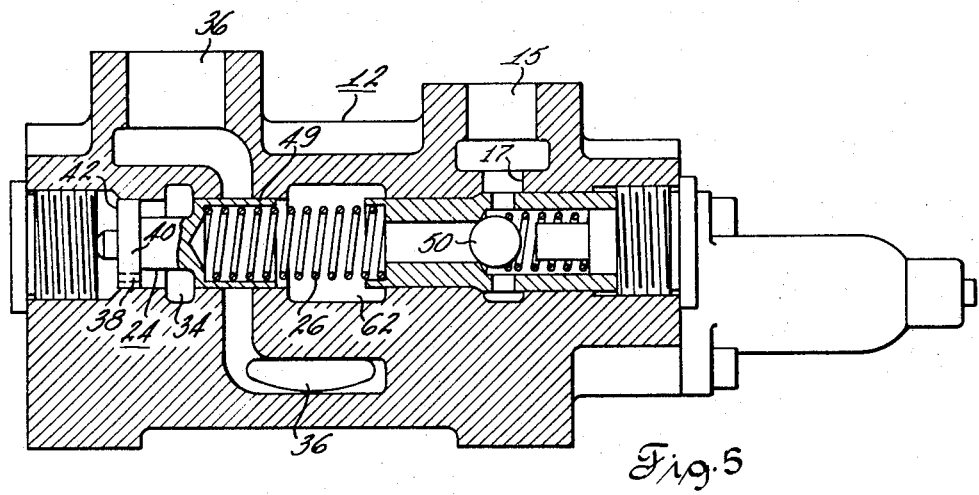
FIG. 5 is a cross section view taken on line V—V of FIG. 3.
Figure 3:
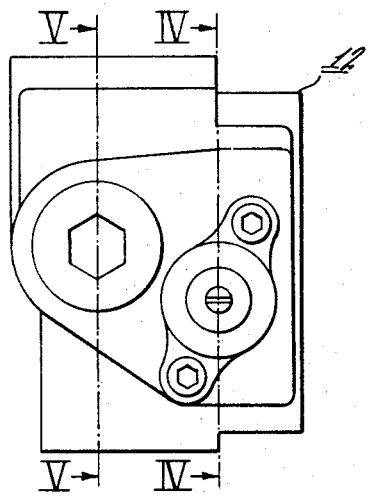
FIG. 3 is an end view of the draft control valve.

Referring to FIGS. 4 and 5 the pump is pressurizing fluid and delivering it to the inlet passage which is in communication with the chambers 20, 28, and 34. In the neutral position the spool 18 is positioned so pressurized fluid is metered through a metering groove 22 and allowed to pass to chamber 30. The bifurcated portion of the switch valve element 91 allows the pressurized fluid to pass through the slot 60 to the passage 46 which is in communication with the outlet passage 36 and returns through the conduit 31 to reservoir 14. The major portion of the pressurized fluid passes into chamber 34 and the bypass valve 24 permits the fluid to pass to the outlet passage 36 to conduit 31 to the reservoir 14. The biasing force of spring 26 is rated at a force which will permit the valve element 49 to compress the spring and open the bypass valve when a pressure of 40 pounds per square inch is in the chamber 34. Substantially all of the pressurized fluid returns to the reservoir and the pump is for all practical purposes unloaded.

When the spool 18 is moved to the left the poppet valve element 19 unseats from its mating valve seat permitting the flow of pressurized fluid from the actuator 16 through the actuator passage 15 to the chamber 17. The opening of the poppet valve element 19 from its mating valve seat permits the pressurized fluid to pass into chamber 21 and chamber 37 and flow through the passages 25 and 46 to the return outlet passage 36 to return to the reservoir. The return flow of the pressurized fluid is limited by the restriction of the limited opening of the land 23 on the spool 18. The orifice grooves 90 permit metering of the pressurized fluid as it passes through from chamber 21 to chamber 37. The lowering of the implement is thereby limited in its rate of movement and this position of the valve is designated as restricted lowering position.

The full lowering position is indicated on the schematic diagram. Referring to FIG. 4 the spool 18 moves farther to the left permitting a greater opening of the poppet valve element 19 from its mating valve seat and the spool 23 moves into the chamber 21 to permit a rapid flow of pressurized fluid from chamber 17 through chamber 21 to chamber 37 which is then returned through the passages 25, 46, and outlet passage 36 through conduit 31 to the reservoir.

The traction boost lift position as indicated in the schematic illustration restricts the rate of flow to the actuator 16. Traction boost lift provides a limited movement of pressurized fluid through the valve to control the weight distribution of the implement with relation to the tractor and increase the traction of the tractor rear wheels by increasing the amount of weight on the rear wheels which will overcome the increased draft load on the draft linke 2. To accomplish this the spool 18 is moved to the right permitting pressurized fluid to flow through the restricted grooves 22 in the land 44 and the fluid passes into the chamber 30. Initially the fluid passes through the slot 60 to the passage 46 and the outlet passage 36.

The pressurized fluid is also permitted to pass through the passage 56 to the chamber 41 actuating the switch valve element 91. The increase in pressurized fluid in the chamber 41 causes a movement of the switch valve element 91 to close the opening of slot 60 and cause a build up of pressure in chamber 30. The pressure builds up in chambers 30 and 62 until the the check valve 50 is unseated and the fluid passes into the actuator outlet 15. The movement of the pressurized fluid continues at a restricted rate through grooves 22 causing a shifting of the implement in response to the actuation of the actuator 16. Simultaneously the fluid builds up in the chamber 62 which biases the valve element 49 to restrict the opening between chamber 34 and 36. This movement of the valve element 49 increases the actuator pressure. The differential of pressure between chambers 62 and 34 is the equivalent of the biasing force of spring 26. If a large flow demand is required by the load on actuator 16 complete shutoff of the valve 24 will be accomplished.

The schematic diagram also shows the full lift position for the spool 18. The spool in the full lift position permits pressurized fluid to close the switch valve spool 48 causing a complete build up of pressure in the chamber 62. The complete build up in chamber 62 causes the bypass valve 24 to completely close and all the pressurized fluid in the hydraulic system is diverted to the hydraulic actuator to produce a rapid lift of the implement. This is accomplished through the use of a manual control lever or under extreme circumstances might be controlled automatically by the lift mechanism when a sudden increasing load is applied to the draft links 2.

What is claimed is:

1. A hydraulic flow control valve comprising, means defining an inlet passage means adapted for connection to a source of pressurized fluid, means defining a first outlet passage means adapted for connection to a fluid reservoir, means defining a second outlet passage means adapted for connection to fluid actuator, a flow divider valve connected to said inlet passage means for dividing the flow of pressurized fluid into a first portion and a second portion, a bypass valve connected between said flow divider valve and said first outlet passage means for bypassing the first portion of pressurized fluid to the reservoir, a switch valve connected intermediate said flow divider valve and said first outlet passage means for passing the second portion of pressurized fluid to said first outlet passage means, a unidirectional valve connected between said flow divider valve and said second outlet passage means, a switch valve actuating means defining a pressure chamber for receiving pressurized fluid from said flow divider valve in response to actuation of said flow divider valve biasing said switch valve to a closed position for directing flow of pressurized fluid through said unidirectional valve for actuation of a fluid actuator.

2. A hydraulic flow control valve as set forth in claim 1 wherein said bypass valve defines a pressure chamber connected to said flow divider valve for receiving pressurized fluid in response to actuation of said flow divider valve to bias said bypass valve toward a closed position causing a greater amount of pressurized fluid to flow as said second portion of pressurized fluid through said second outlet passage means for actuation of said fluid actuator.

3. A hydraulic fluid flow control valve as set forth in claim 1 wherein said flow divider valve defines metering grooves for metering the flow of the second portion of pressurized fluid during initial operation of said flow divider valve to gradually increase the flow for actuation of the fluid actuator.

4. A hydraulic flow control valve as set forth in claim 1 wherein said unidirectional valve is a ball check valve permitting the flow of said pressurized fluid from said flow divider valve to said second outlet passage means for actuation of the fluid actuator.

5. A hydraulic flow control valve as set forth in claim 1 wherein said switch valve includes a spring normally biasing said switch valve to an open position for passing pressurized fluid from said flow divider valve to said first outlet passage means when said switch valve is open.

6. A hydraulic flow control valve as set forth in claim 1 wherein said switch valve is normally biased to an open position for passing the second portion of pressurized fluid from said flow divider valve when said flow divider valve is in the closed position and said switch valve is biased to a closed position in response to a change in pressure in said pressure chamber of said switch valve actuating means.

7. A hydraulic flow control valve as set forth in claim 1 wherein said switch valve actuating means includes a power wall defining a variable volume spring chamber receiving a spring normally biasing said switch valve to an open position and a variable volume pressure chamber for biasing said switch valve to a closed position in response to receiving pressurized fluid from said flow divider valve when said flow divider valve is actuated.

References Cited

UNITED STATES PATENTS 3,324,881   6/1937   Keir _____ 137—596.13

HENRY T. KLINKSIEK, *Primary Examiner.*